May 1, 1945.	S. M. COOPER	2,375,166
SEAL BEARING
Filed March 5, 1941
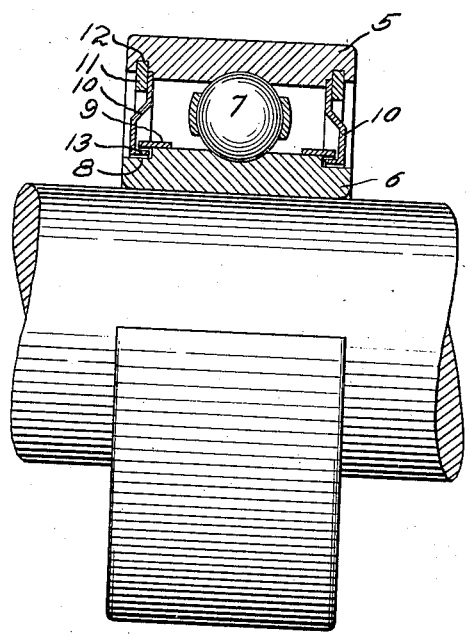
INVENTOR
STANLEY M. COOPER
BY
ATTORNEYS.

Patented May 1, 1945

2,375,166

UNITED STATES PATENT OFFICE 2,375,166

SEAL BEARING

Stanley M. Cooper, New Britain, Conn., assignor to The Fafnir Bearing Company, New Britain, Conn., a corporation of Connecticut Application March 5, 1941, Serial No. 381,782

2 Claims. (Cl. 286—5)

My invention relates to a seal bearing.

It is an object of the invention to provide a simple, improved form of seal bearing.

Other objects and features of novelty and improvement will be hereinafter pointed out or will become apparent to those skilled in the art.

The drawing shows, for illustrative purposes only, an edge view of an anti-friction bearing in quarter section and illustrating the invention.

The bearing shown in the drawing includes an outer bearing ring 5, an inner bearing ring 6, with interposed anti-friction bearing members, such as balls 7, running in raceways and holding the bearing rings in unit-handling relationship.

My improved seal is of the labyrinth type and is of simple construction and has advantages over similar seals. One of the rings in its circumferential surface facing the other ring is turned down from the axially extending circumferential surface thereof, and a sleeve, preferably of sheet metal, is secured on the ring and has a portion extending over the turned-down portion and preferably terminates short of the adjacent end of the bearing ring. The turned-down portion and the sleeve form an axially extending open-ended annular groove. The opposite bearing ring carries a seal plate having an inwardly directed flange fitting in but preferably free of the groove, so as to form an effective labyrinth type of seal.

In the specific instance illustrated the inner ring is provided with a turned-down portion or rabbet 8 extending inwardly from the end of the bearing. A sheet metal continuous sleeve 9 is secured to the outer circumferential surface of the inner ring 6 by any suitable means, such as by a press fit. The sleeve 9 extends over the turned-down portion 8 and preferably terminates short of the adjacent end of the inner ring. The projecting portion of the sleeve 9 and the turned-down portion 8 form an axially outwardly directed groove at the end of the inner ring. A plate seal or disk 10 is secured to the outer ring by any suitable means, such as by the split spring ring 11, fitting in a circumferentially extending groove 12 and abutting the outer side of the plate seal 10 adjacent its periphery. The plate seal 10 at its inner edge has an axially inwardly extending flange 13, which extends into the groove formed by the sleeve 9 and the turned-down portion 8 of the inner ring. The flange 13 is preferably free of all sides of the groove and yet lies in close proximity thereto, so as to form a very effective labyrinth type of seal.

One of the particular advantages of my improved seal is the simplicity of its structure and the ease of manufacture. A further important advantage is that the axially extending groove is formed in the end of the inner ring and yet only a very small amount of metal need be removed, thus leaving a very substantial shoulder at the end of the inner ring for engagement by a nut or other holding means which may be employed for securing the inner ring in place on a shaft. If the entire groove were formed by an axially directed groove cut in the inner ring, the available shoulder for engagement by the nut or other means justed referred to would be very much reduced. Furthermore, the turned-down end of the inner ring may be very readily formed during the course of manufacture by a substantial, sturdy tool, whereas if the groove were formed entirely in the end of the inner ring instead of in part by the separate sleeve, a very thin and frail tool would have to be employed and such a tool would be extremely liable to breakage. This is particularly so with the smaller size bearings. In the preferred form the entire seal is within the axial limits of both rings.

While the invention has been described in considerable detail and a preferred form illustrated, it is to be understood that changes may be made within the scope of the invention as defined in the appended claims.

I claim:

1. Seal means for a structure comprising inner and outer relatively rotatable concentric rings held in spaced apart relationship and against substantial relative axial movement, one of said rings in the annular side facing the other of said rings having a turned-down portion open to the end of the ring, a continuous annular sleeve member of thin metal of uniform inner and outer diameters, said sleeve member being presed onto said ring having said turned-down portion and forming therewith an axially outwardly extending annular groove, a seal plate of sheet metal secured to the other of said rings and extending across the space between said rings and having an inturned annular flange member extending into said groove formed by said turned-down portion and said sleeve, said inturned flange lying in close sealing proximity to the adjacent annular surfaces of said sleeve and of said turned-down portion, said inturned annular flange being extended into said groove for a distance equal to several times the thickness of the sheet metal forming said inturned annular flange.

2. Seal means for a structure, including inner and outer relatively rotatable concentric rings held in spaced apart relationship and against substantial relative axial movement, said inner ring having a turned-down portion on its outer circumferential side extending axially inwardly from one end thereof, a sleeve of thin metal of uniform cross-section secured about the outer circumferential side of said inner ring and extending over said turned-down portion whereby an axially inwardly extending annular groove is formed between said turned-down portion and a portion of said sleeve, a sheet metal seal plate secured to said outer ring and extending across the space between said rings and having an inturned annular flange at its inner edge extending into said axially extending annular groove, said flange lying in close sealing proximity to but free of said turned down portion and of said sleeve, said inturned annular flange being extended into said axially extending annular groove for a distance equal to several times the thickness of the sheet metal forming said inturned annular flange.

STANLEY M. COOPER.